UNITED STATES PATENT OFFICE.

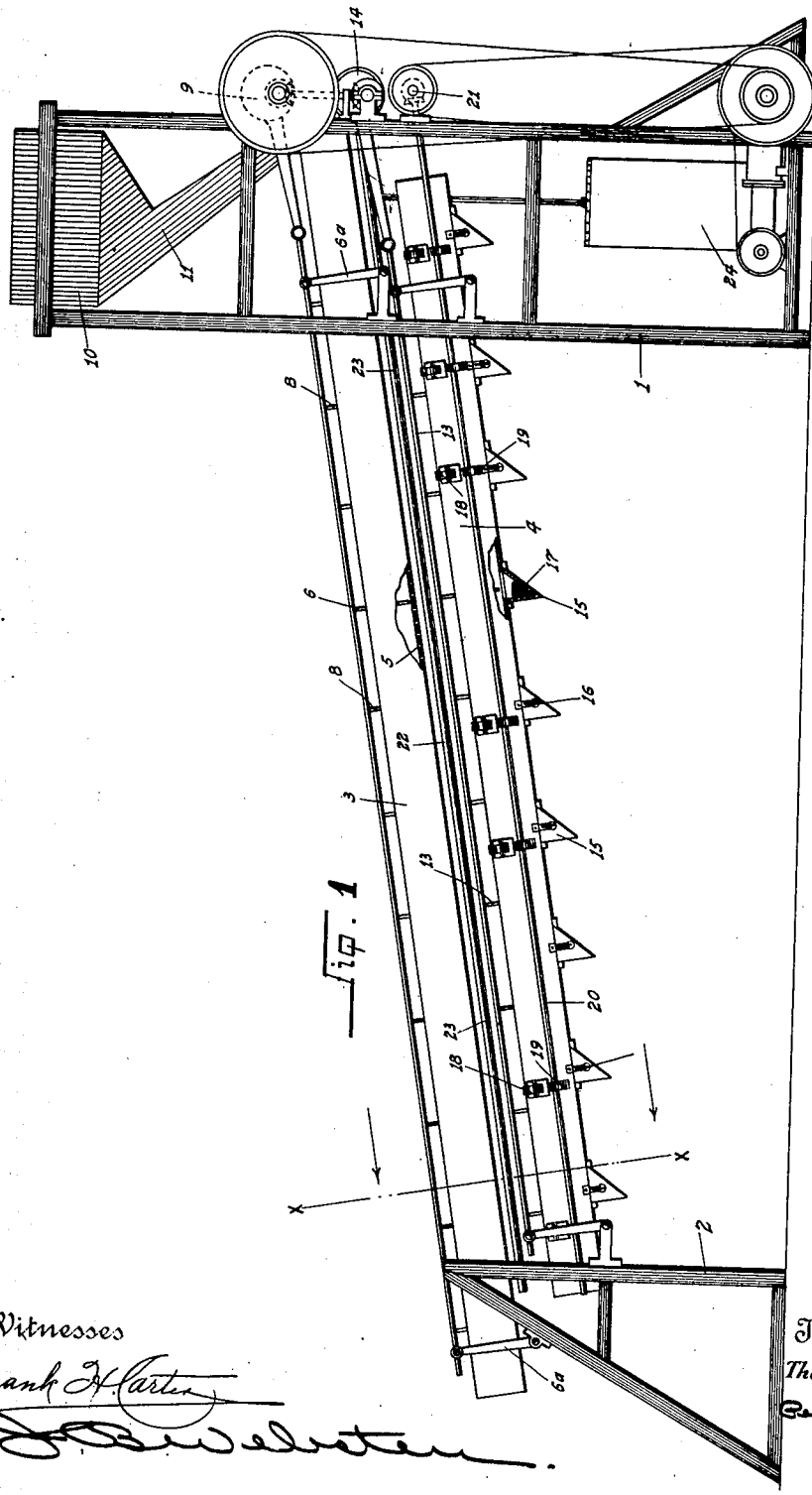

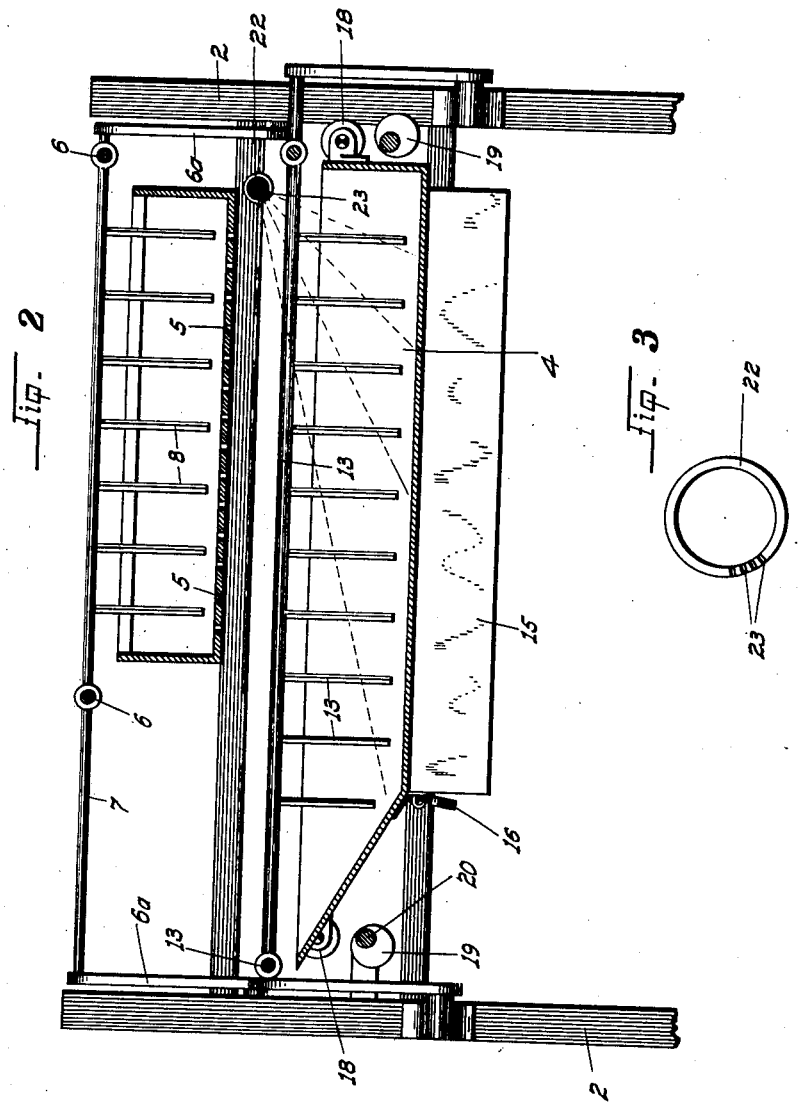

THORSTEIN THORDSON, OF OAKLAND, CALIFORNIA.

GOLD-FILTERING MACHINE.

No. 895,599.

Specification of Letters Patent.

Patented Aug. 11, 1908.

Application filed November 21, 1907. Serial No. 403,127.

*To all whom it may concern:*

Be it known that I, THORSTEIN THORDSON, a subject of Norway, residing at Oakland, in the county of Alameda and State of California, have invented certain new and useful Improvements in Gold-Filtering Machines; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in gold finding, gathering and filtering machines, my object being to produce such a device as will separate gold from sand, gravel and like material without the necessity of washing or amalgamating it, thus making it possible to operate the same in dry sections where water power is not available. This object I accomplish by means of inclined troughs spaced apart one above the other, an agitating means disposed in said troughs, holes disposed in the bottoms of the upper troughs, a blast means for said troughs, and a means of supply for the lower trough; also vibrating means for the lower trough; also by such other and further construction as will appear by a perusal of the following specifications and claims.

In the drawings similar characters of reference indicate corresponding parts in the several views.

Figure 1 is a side elevation of the complete device. Fig. 2 is a sectional view taken on a line x x of Fig. 2. Fig. 3 is an end view of an air blast pipe.

Referring now more particularly to the characters of reference on the drawings 1 and 2 designate suitable supporting members, secured on which are two inclined troughs 3 and 4, the bottom of the trough 3 being provided with a plurality of orifices 5. Disposed in the trough 3 is an agitating rake composed of two driving rods 6 having cross members 7 on which are agitating teeth 8. The upper end of said rake is suitably connected with a driving crank 9, said rods 6 being pivotally suspended at each end to oscillating arms 6ª.

10 is a hopper or bin disposed above the trough 3 and having a chute 11 discharging into the trough 3 at its upper end.

The trough 4 is wider than the trough 3 and has its extending side sloping inward as at 12. Also disposed in said trough 4 is an agitating rake 13 constructed the same as that in the trough 3 and connected with a driving crank 14.

Disposed across the bottom of trough 4 are a plurality of removable trays 15 into which the trough 4 opens, said trays being normally locked in position by means of locks 16 and containing quick silver 17.

Disposed on the sides of the trough 4 are a plurality of small wheels 18 with which eccentric cams 19 are adapted to coact, said eccentric cams being actuated by a shaft 20 suitably connected with a driving gear 21.

22 is a blast pipe disposed intermediate the troughs 3 and 4 at their alined edges and having orifices 23 directed toward said trough 4 and the sloping side 12. Said pipe is suitably connected with an air compressor 24.

In practice the gravel or sand is filled into the hopper 10 from whence it discharges through the chute 11 into the trough 3 where it is agitated by means of the agitating rake 6—7—8, this agitation working the fine sand and gold through the orifices 5 in the bottom of the trough 3, thence into the trough 4, while the larger stones and dirt carry out at the lower end of the trough 3.

As the fine sand and gold passes into the trough 4 the agitating rake 13 agitates the same, thus working the heavier gold to the bottom and into the trays 15, while the finer, lighter sand is carried out over the sloping side 12 by means of the air blast from the pipe 22.

To aid the agitating rake 13 the cams 19 continually striking the wheels 18 keep the trough 4 vibrating, thus aiding in settling the gold to the bottom and into the trays 15.

When desired the locks 16 may be unlocked and the trays 15 removed, emptied and replaced. Thus it will be seen that I have produced a gold filtering machine, which substantially fulfils all the objects of the invention as set forth herein.

While this specification sets forth in detail the present and preferred embodiment of my invention, still in practice many small deviations from such detail may be resorted to without departing from the spirit of the invention.

Having thus described my invention what I claim as new and useful and desire to secure by Letters Patent is:—

A gold filtering machine comprising stationary inclined troughs disposed one above the other and spaced apart, one of said troughs being of a greater width than the other and having a side sloping inward, and an air blast means disposed intermediate said troughs and directed toward the bottom and said sloping side of the said wider trough, the upper trough having openings directed toward the lower trough, as set forth.

In testimony whereof I affix my signature in presence of two witnesses.

THORSTEIN THORDSON.

Witnesses:
PERCY S. WEBSTER,
FRANK H. CARTER.